United States Patent
Wind et al.

(10) Patent No.: US 7,693,794 B2
(45) Date of Patent: Apr. 6, 2010

(54) COMPUTER SYSTEM AND COMPUTER-IMPLEMENTED METHOD FOR CREATING TRAVEL-EXPENSE STATEMENTS

(75) Inventors: Oliver Wind, Dudenhofen (DE); Simone Roth, Heidelberg (DE); Matthias Berger, Wiesloch (DE); Jens Bombolowsky, Schwetzingen (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 10/865,915

(22) Filed: Jun. 14, 2004

(65) Prior Publication Data

US 2005/0015272 A1 Jan. 20, 2005

Related U.S. Application Data

(60) Provisional application No. 60/478,447, filed on Jun. 13, 2003.

(30) Foreign Application Priority Data

Oct. 28, 2003 (EP) .................. 03024675
Nov. 18, 2003 (EP) .................. 03026344

(51) Int. Cl.
 *G06Q 40/00* (2006.01)
(52) U.S. Cl. ....................................... 705/44
(58) Field of Classification Search .............. 705/44
 See application file for complete search history.

(56) References Cited

U.S. PATENT DOCUMENTS

| | | | |
|---|---|---|---|
| 5,191,523 A * | 3/1993 | Whitesage ................. | 705/6 |
| 5,899,981 A * | 5/1999 | Taylor et al. ............... | 705/30 |
| 6,009,408 A * | 12/1999 | Buchanan .................. | 705/11 |
| 6,442,526 B1 * | 8/2002 | Vance et al. ............... | 705/5 |
| 7,194,417 B1 | 3/2007 | Jones | |
| 2001/0044748 A1 | 11/2001 | Maier | |
| 2002/0133381 A1 | 9/2002 | Tso | |
| 2002/0194036 A1 | 12/2002 | Cheng et al. | |
| 2003/0028454 A1 | 2/2003 | Ooho et al. | |
| 2003/0040987 A1 * | 2/2003 | Hudson et al. ............. | 705/30 |
| 2003/0088487 A1 * | 5/2003 | Cheng et al. .............. | 705/30 |
| 2003/0120526 A1 * | 6/2003 | Altman et al. ............. | 705/5 |
| 2005/0091092 A1 | 4/2005 | Wind et al. | |
| 2005/0102520 A1 | 5/2005 | Baxter et al. | |

FOREIGN PATENT DOCUMENTS

| | | |
|---|---|---|
| EP | 0762306 A2 | 3/1997 |
| WO | WO 02/07047 A1 | 1/2002 |
| WO | WO 03/034179 A2 | 4/2003 |

* cited by examiner

OTHER PUBLICATIONS

European Search Report from the European Patent Office, dated Aug. 3, 2004 (3 pages).

*Primary Examiner*—Kambiz Abdi
*Assistant Examiner*—Lindsay M. Maguire
(74) *Attorney, Agent, or Firm*—Finnegan, Henderson, Farabow, Garrett & Dunner, LLP

(57) ABSTRACT

Computer system and computer-implemented method for creating travel-expense statements. The computer system is based on electronic data processing means comprising identifying means for automatically creating particular identifying data for identifying which of the travel-expense receipts were related to particular business trips, and determining means for automatically collecting the identifying data of the travel-expense data for determining the travel-expense receipts associated with the particular identifying data. Rather than showing all entries, only those automatically-identified entries may be presented to the user as items that should be associated with a particular travel-expense statement.

7 Claims, 3 Drawing Sheets

COMPUTER SYSTEM AND COMPUTER-IMPLEMENTED METHOD FOR CREATING TRAVEL-EXPENSE STATEMENTS

CROSS REFERENCE TO RELATED APPLICATIONS

This application claims the benefit of U.S. patent application Ser. No. 60/478,447, filed on Jun. 13, 2003, the disclosure of which is expressly incorporated herein by reference to its entirety.

DESCRIPTION

1. Technical Field

The present invention generally relates to electronic data processing, and in particular to a system and method for automated payment of travel-expenses and creating travel-expense statements, a computer system and computer-implemented method for creating travel-expense statements, and a computer program product and data carrier for creating travel-expense statements.

2. Background

In a global business environment, travel is a necessary and expensive fact of life. Travel managers in companies are pushing for more transparency and new strategies for managing, controlling, and minimizing the increasing costs related to business travel.

Currently, travel management systems include the processes of requesting travels, planning travels, and settlement of travel-expenses by creating travel-expenses statements. A system for travel management is, for example, the SAP Travel Management System (SAP TM) performing all the processes involved with business travels.

Most major credit card providers are certified for interface with the SAP Travel Management System. The automated payment system of the providers allows the integration of transaction data relating to travel-expenses paid with corporate credit cards or travel center/ghost cards. The transaction data are imported into the SAP system using accounting files supplied by the credit card providers. The transaction data are arranged to provide travel-expense data for creating travel-expense receipts, i.e. information such as type, date, and amount of receipts. The travel-expense data are stored for each payment.

The automated payment systems of the credit card providers and the SAP system are interconnected with a network, for example intranet or internet (world wide web) allowing the rapid and simple transfer of the transaction data. All travel-expense receipts associated with all business travels of the user are presented. In order to create a travel-expense statement for a particular business trip, the user has to assign the travel-expense receipts to the particular trip by manually selecting the corresponding travel-expense data. The process of selecting the corresponding travel-expense receipts is hereinafter designated as credit card clearing.

SUMMARY

It is accordingly desirable to provide a system for automated paying travel-expenses and creating travel-expense statements and a computer system for creating travel-expense statements, which allows an automated credit card clearing in order to simplify the creation of travel-expense statements.

It is further desirable to provide a method for automated payment of travel-expenses and creating travel-expense statements, a computer-implemented method for creating travel-expense statements, and a computer program product and data carrier for creating travel-expense statements, which permit automated credit card clearing.

In accordance with the purpose of the invention as embodied and broadly described herein, the computer system for creating travel-expense statements is based on electronic data processing means comprising identifying means for automatically creating particular identifying data for identifying which of stored travel-expense data were related to particular business trips, and determining means for automatically collecting the identifying data for determining the travel-expense receipts associated with the particular identifying data. Rather than showing all entries, only those automatically-identified entries are presented to the user as items that should be associated with a particular expense statement. The identified items may be transferred to create relevant travel-expense statements.

The transaction data are transferred between the automated payment system and the computer system as an accounting file via data exchange means, e.g. network means or data carrier (diskette). The travel-expense receipts associated with the particular identifying data are presented to the user.

The transaction data of the automated payment system is information such as type, date, and amount of a travel-expense receipt. It is advantageous if the particular identifying data is the date of the travel-expense receipt. An embodiment of the system is based on the collection of the dates of all travel-expense receipts and the determination which travel-expense receipts are in the predetermined frame of period of time of the user's business trip.

In another aspect, the automated payment system advantageously comprises magnetic-stripe cards or smart cards for payment. However, the transaction data may also be provided, for example, by paying via financial accounting.

In yet another aspect, input means are provided for selecting the travel-expense receipts associated with a particular business trip from the presented travel-expense receipts in order to cancel certain receipts, for example, in the case that the receipts are associated with private rather than business expenses. Furthermore, the possibility of canceling certain receipts allows the user a correction in the case of incorrect assignments.

These and other features, objects, and advantages of the embodiments will become apparent when the detailed description of the embodiments is read in conjunction with the drawings as well as the appendix attached hereto.

DESCRIPTION OF THE EMBODIMENTS

Reference will now be made in detail to the present invention, examples of which are illustrated in the accompanying drawings in which like reference numbers refer to corresponding elements.

Figure 1:
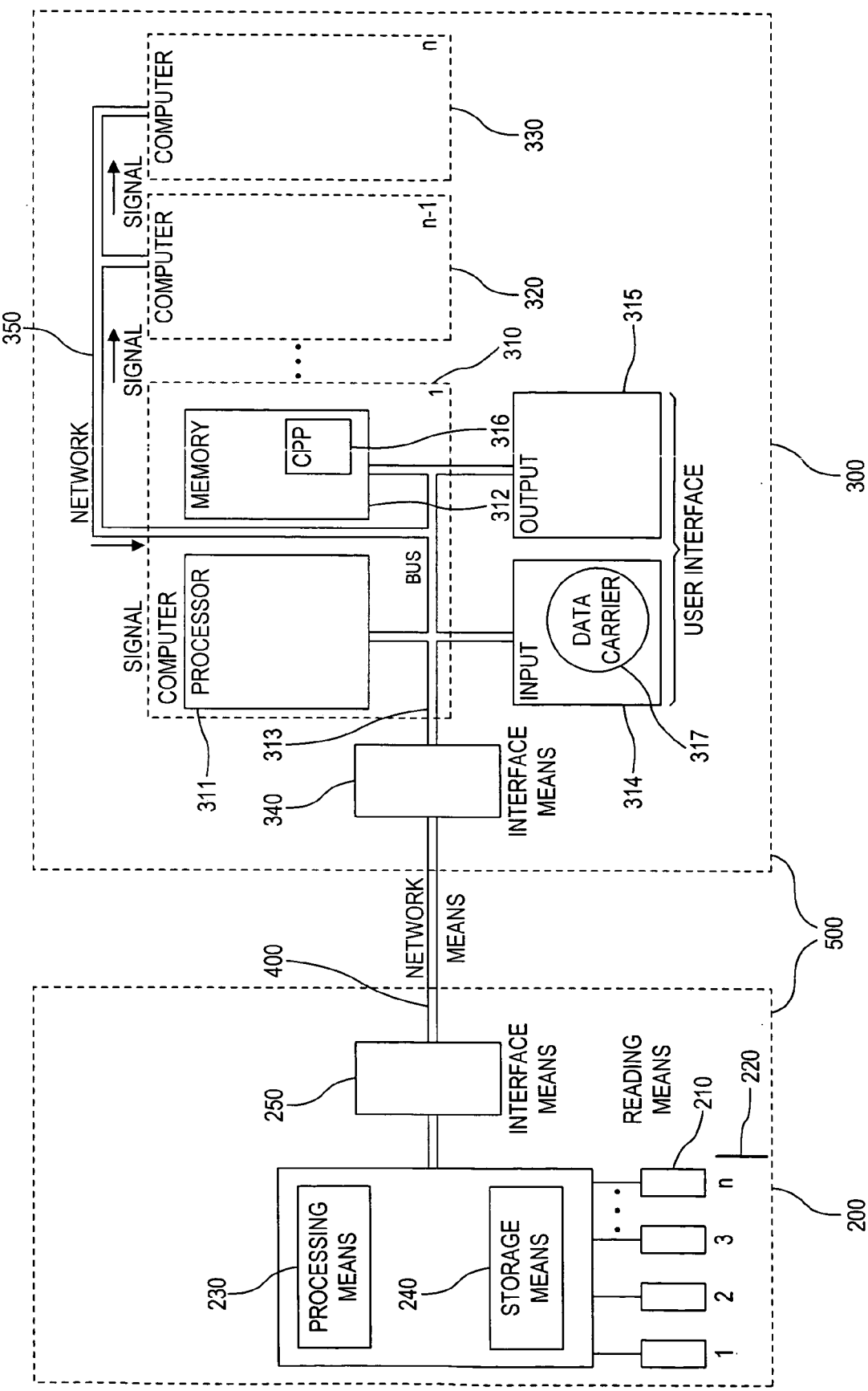
FIG. 1 is a simplified block diagram illustrating the system for automated payment and creating travel-expense statements consistent with the invention.

FIG. 1 illustrates the system 500 for automated payment of travel-expenses and creating travel-expense statements. The system 500 comprises an automated payment system 200, a computer system 300 for creating travel-expense statements and network means 400 for interconnecting the payment system with the computer system.

The automated payment system 200 comprises a plurality (n) of credit card reading means 210 for reading data of corporate credit cards 220 and data processing means 230 for processing data associated with each payment using a corporate card. The data processing means 230 provides transaction data to be transmitted to the computer system 300. The payment system 200 further comprises storage means 240 for storing the transaction data and interface means 250 for transmitting the transaction data to the computer system.

The data exchange means 400 for interconnecting the automated payment system 200 with the computer system 300 is, for example, a network means, e.g. intranet or internet, i.e. world wide web, or any other networking environments, for example a Public Switched Telephone Network (PSTN), an Integrated Services Digital Network (ISDN), and an Universal Mobile Telecommunications System (UMTS). The data exchange means may also be simply a data carrier like a diskette. Although FIG. 1 illustrates only a single computer system, there may be provided a plurality of computer systems interconnected to a single automated payment system or a plurality of payment systems.

The computer system 300 comprises a single computer or a plurality (n) of computers 310, 320, 330 coupled via inter-computer network (FIG. 1). Each computer comprises data processing means 311 (processor), storage means 312 (memory), bus means 313 (bus), input means 314 and output means 315 (input and output devices). Further interface means 340 are provided. The computer system may also be simply a server.

The Computer is, for example, a conventional Personal Computer (PC). The Processor is, for example, a Central Processing Unit (CPU), a Micro Controller Unit (MCU), Digital Signal Processor (DSP), or the like.

The storage means 312 is in particular provided for storing the transaction data of the automated payment system 200. Storage means 312 symbolizes any memory means for temporarily or permanently storing data and instructions. Although memory is conveniently illustrated as part of computer, memory function may also be implemented in a network, as computer and processor itself, e.g. cache, registers, or elsewhere. Memory is, for example, a Read Only Memory (ROM), Random Access Memory (RAM). Memory is physically implemented by computer-readable media, for example: (a) magnetic media, such as hard disk, floppy disk or other magnetic disk, tape or cassette tape; (b) optical media, such as optical disk (CD-ROM, DVD); (c) semiconductor media, like DRAM, SRAM, EPROM.

The memory means 312 may further store support modules, for example, a Basic Input Output System (BIOS), Operating system (OS), program library, compiler or interpreter. For simplicity, these modules are not illustrated.

The output means 315 for presenting the travel-expense receipts symbolizes any device presenting data that have been processed, for example, a monitor or a display, for example, a Cathode Ray Tube (CRT), Flat Panel Display, Liquid Crystal Display (LCD), a printer, plotter or speaker.

The input means 314 symbolizes any device for providing data and instructions for processing by computer, for example, a keyboard or pointing device such as a mouse, trackball or cursor direction key.

To achieve the foregoing, a Computer Program Product (CPP) 316 and a data carrier 317 are provided, CPP and data carrier being, hereinafter, designated as "program." CPP comprises program instructions and -optionally- data that cause processor to execute method steps of the present invention. In other words, CPP defines the operation of computer and its interaction in inter-computer network. For example, CPP may be available as source code in any programming language, and as object code (binary code) in a compiled form. Persons skilled in the art can use CPP in connection with any of the support modules (e.g. compiler, interpreter). The method steps of the present invention are explained with more detail below.

The data carrier 317 is illustrated outside the computer. For the communication of CPP and computer, data carrier is conveniently inserted into input device. Data carrier is implemented as any computer readable medium. Generally, carrier is an article of manufacture comprising a computer readable medium having readable program code means embodied therein for executing the method steps of the present invention. Furthermore, program signal can also embody computer program. Program signal is transmitted via inter-computer network.

Computer bus 313 and inter-computer network 350 provide logical and physical connections by conveying data and instruction signals. While connections inside computer are conveniently referred as bus, connections between computers are referred as inter-computer network. Connections between computer system and payment system is simply referred as network. Network also comprises hard or software protocol translation devices that allows users working in one network to access another network (gateway). Transmission protocols and data formats are known as, for example, Transmission Control Protocol/Internet Protocol (TCP/IP), Hyper Text Transfer Protocol (HTTP), Unique Resource Locator (URL), etc.

The interface means 340 for receiving the transaction data of the automated payment system 200 is a device or port that allows the computer and payment system to be linked together in a standard communication system, for example, an internal or external modem.

Computer and program are closely related. As used hereinafter, phrases such as "computer provides" and "program provides" are convenient abbreviations to express actions by the computer that is controlled by the program. While the signals inside the computer are mostly electrical signals, the signals in network are electrical, magnetic, optical or radio signals.

Figure 2:
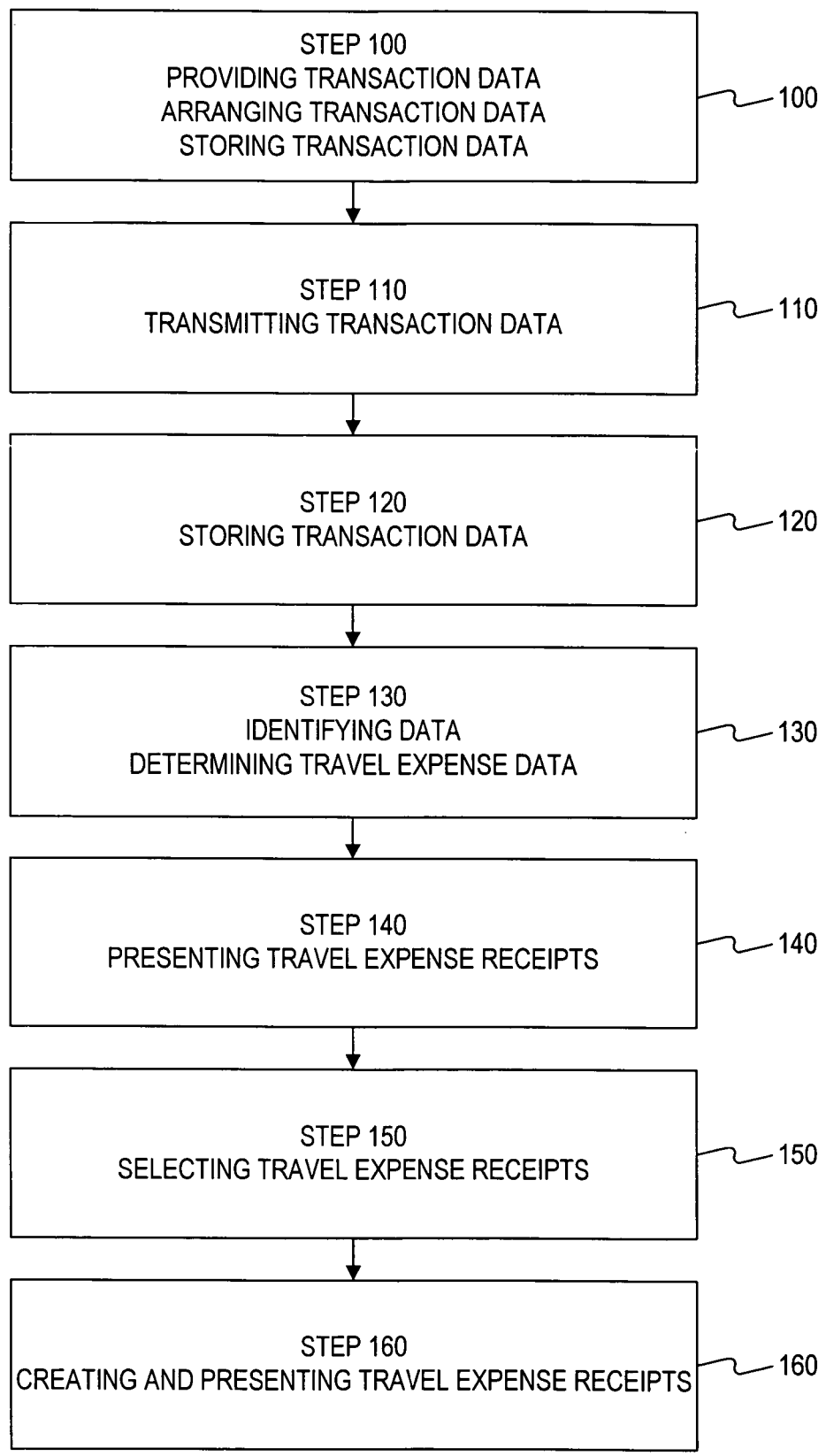
FIG. 2 is a simplified flow chart illustrating the method steps consistent with the invention.

FIG. 2 illustrates a method 100 for automated payment of travel-expenses and creating travel-expense statements consistent with the invention. The steps of method 100 are now explained in detail.

The automated payment system 200 reads data stored on corporate cards 220 each time when paying with the corporate cards.

In method step 100, the data processing means 230 of the automated payment system 200 provide transaction data taking into consideration the data stored on the corporate cards for identifying the user of the card, i.e. the traveler, and additional data associated with each payment of the traveler. The transaction data are stored in the storage means.

Figure 3:
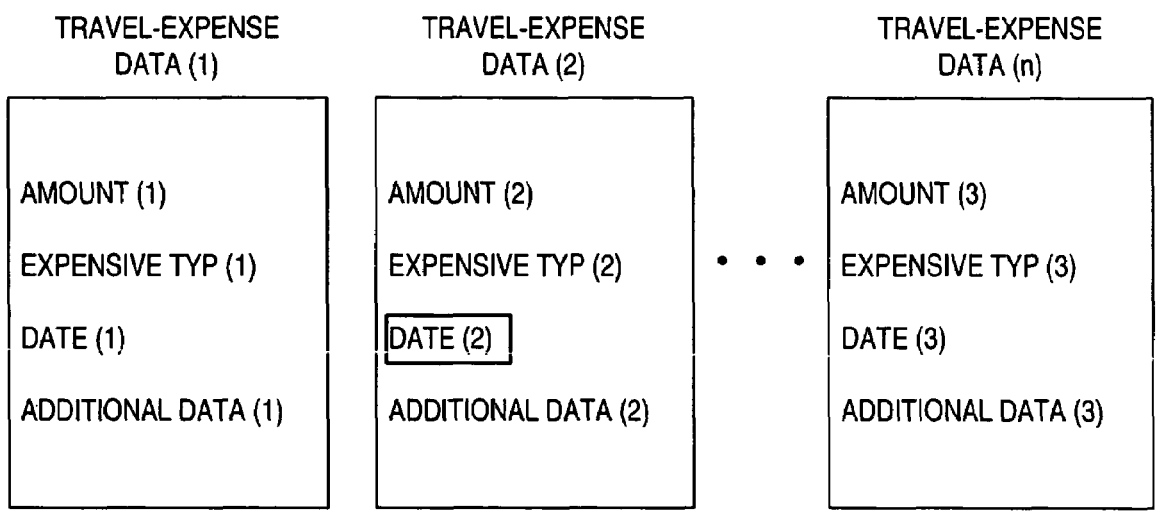
FIG. 3 illustrates the arrangement of the transaction data of the automated payments system.

The transaction data are arranged to provide travel-expense data for creating travel-expense receipts associated with business trips. FIG. 3 illustrates the stored travel-expense data of a plurality of payments using the corporate cards during the business trips. The travel-expense data include data associated with the amount of payment, the expense type, such as hotel, flight, restaurant etc., data associated with the date of payment, and certain additional data.

After transaction data having been provided for a predetermined period of time, in method step 110, the transaction data are transmitted to the computer system 300 via the data exchange means 400. The interface means 250 of the payment system 200 and the computer system 300 allow the data transmission between both systems.

In method step 120, the transaction data received from the payment system 200 are stored in the storage means 312 of the corresponding computer 310, 320, 330 of the computer system.

In method step 130, the program causes the processing means 311 of the corresponding computer to create identifying data which of the stored travel-expense data were related to a particular business trip. In an embodiment of the invention, the identifying data is, for example the date or amount. The program causes the processing means to collect the identifying data of each travel-expense data and determine the travel-expense receipts associated with the particular identifying data by deciding which of the travel-expense data are within a predetermined time frame, i.e. the period of time between beginning and end of the particular business travel.

In method step 140, the output means 315 of the corresponding computer presents only those travel-expense receipts associated with the particular identifying data, i.e., travel-expense data in the present case.

In method step 150, the program detects which of the presented travel-expense receipts have been selected by the user to be canceled and cancels those receipts to be selected by having input data with the input means 314. This step offers the user the possibility to make any corrections, for example, if some of the automatically selected receipts are not related to the particular business trip.

In method step 160, the computer system 300 creates and presents a travel-expense statement on the output means 315, i.e. computer screen, taking into consideration the automatically selected receipts. The travel-expense statement may be stored and transmitted to another computer of the computer system, e.g. for requesting reimbursement.

The method of automated payment of travel-expenses and creating travel-expense statements consistent with the present invention comprises the method steps 100 to 160, whereas the computer-implemented method for creating travel-expense statements only comprises method steps 120 to 160.

The present invention does not only refer to the computer-implemented method and computer system for creating travel-expense statements, but also to a computer program product that can be stored on a computer readable data carrier, and the data carrier. The computer program product for creating travel-expense statements comprises a plurality of instructions for causing the processing means of the corresponding computer of the computer system the method steps of 120 to 160.

What is claimed is:

1. A system for automated payment and creating travel-expense statements, the system comprising: a computer system; an automated payment system for providing transaction data, the transaction data including travel-expense data for a plurality of business trips and travel-expense receipts for the plurality of business trips, the travel-expense receipts being associated with the travel-expense data, the automated payment system comprising first interface means for transmitting the transaction data to the computer system; and
    data exchange means for interconnecting the automated payment system with the computer system;
    wherein the computer system comprises:
    second interface means for receiving the transaction data of the automated payment system;
    storage means for storing the travel-expense data associated with the travel-expense receipts for the plurality of business trips;
    processing means configured to execute a program for automatically creating receipt dates of the travel-expense receipts that identify which of the travel-expense receipts for the plurality of business trips are associated with which of the plurality of business trips, receiving travel dates of a particular business trip from a user after the particular business trip, the particular business trip being one of the plurality of business trips, and automatically determining which of the travel-expense receipts for the plurality of business trips are associated with the particular business trip based on the receipt dates of the travel-expense receipts and the travel dates of the particular business trip;
    output means for presenting the travel-expense receipts automatically determined as being associated with the particular business trip to the user;
    input means for enabling the user to select one or more of the presented travel-expense receipts as not being associated with the particular business trip, and disassociating the selected travel-expense receipts from the particular business trip.

2. The system of claim 1, wherein the automated payment system comprises at least one of magnetic-stripe cards or smart cards for automated payment.

3. A computer system for creating travel-expense statements, the computer system comprising:
    interface means for receiving transaction data of an automated payment system for providing automated payment, wherein the transaction data is arranged to provide travel-expense data for a plurality of business trips, the travel-expense data being for creating travel-expense receipts for the plurality of business trips;
    storage means for storing the travel-expense data associated with the travel-expense receipts;
    processing means configured to execute a program for automatically creating receipt dates of the travel-expense receipts that identify which of the travel-expense receipts for the plurality of business trips are associated with which of the plurality of business trips, receiving travel dates of a particular business trip from a user after the particular business trip, the particular business trip being one of the plurality of business trips, and automatically determining which of the travel-expense receipts for the plurality of business trips are associated with the particular business trip based on the receipt dates of the travel-expense receipts and the travel dates of the particular business trip;
    output means for presenting the travel-expense receipts automatically determined as being associated with the particular business trip to the user;
    input means for enabling the user to select one or more of the presented travel-expense receipts as not being associated with the particular business trip, and disassociating the selected travel-expense receipts from the particular business trip.

4. A method for automated payment of and creating travel-expense statements, the method comprising:
    providing transaction data when paying with an automated payment system;
    arranging the transaction data to provide travel-expense data for a plurality of business trips, the travel-expense data being for creating travel-expense receipts for the plurality of business trips;
    transmitting the transaction data to a computer system;

storing the travel-expense data associated with the travel-expense receipts;

automatically creating receipt dates of the travel-expense receipts that identify which of the travel-expense receipts for the plurality of business trips are associated with which of the plurality of business trips;

receiving travel dates of a particular business trip from a user after the particular business trip, the particular business trip being one of the plurality of business trips;

automatically determining, using a processor, which of the travel-expense receipts for the plurality of business trips are associated with the particular business trip based on the receipt dates of the travel-expense receipts and the travel dates of the particular business trip;

presenting the travel-expense receipts automatically determined as being associated with the particular business trip to the user;

enabling the user to select one or more of the presented travel-expense receipts as not being associated with the particular business trip; and disassociating the selected travel-expense receipts from the particular business trip.

5. A computer-implemented method for creating travel-expense statements, the method comprising:

receiving transaction data of an automated payment system for providing automated payment, wherein the transaction data is arranged to provide travel-expense data for a plurality of business trips, the travel-expense data being for creating travel-expense receipts for the plurality of business trips;

storing the travel-expense data associated with the travel-expense receipts;

automatically creating receipt dates of the travel-expense receipts for identifying which of the travel-expense receipts for the plurality of business trips are associated with which of the plurality of business trips;

receiving travel dates of a particular business trip from a user after the particular business trip, the particular business trip being one of the plurality of business trips;

automatically determining, using a processor, which of the travel-expense receipts for the plurality of business trips are associated with the particular business trip based on the receipt dates of the travel-expense receipts and the travel dates of the particular business trip;

presenting the travel-expense receipts automatically determined as being associated with the particular business trip to the user;

enabling the user to select one or more of the presented travel-expense receipts as not being associated with the particular business trip; and disassociating the selected travel-expense receipts from the particular business trip.

6. A computer program product having a plurality of instructions for causing processing means of a computer system to execute a method comprising:

receiving transaction data of an automated payment system for providing automated payment, the transaction data being arranged to provide travel-expense data for a plurality of business trips, the travel-expense data being for creating travel-expense receipts for the plurality of business trips;

storing the travel-expense data associated with the travel-expense receipts;

automatically creating receipt dates of the travel-expense receipts that identify which of the travel-expense receipts for the plurality of business trips are associated with which of the plurality of business trips;

receiving travel dates of a particular business trip from a user after the particular business trip, the particular business trip being one of the plurality of business trips;

automatically determining which of the travel-expense receipts for the plurality of business trips are associated with the particular business trip based on the receipt dates of the travel-expense receipts and the travel dates of the particular business trip;

presenting the travel-expense receipts automatically determined as being associated with the particular business trip to the user;

enabling the user to select one or more of the presented travel-expense receipts as not being associated with the particular business trip; and disassociating the selected travel-expense receipts from the particular business trip.

7. A computer-readable storage medium storing a plurality of instructions for causing a processing means of a computer system to execute a method comprising:

receiving transaction data of an automated payment system for providing automated payment, wherein the transaction data is arranged to provide travel-expense data for a plurality of business trips, the travel-expense data being for creating travel-expense receipts for the plurality of business trips;

storing the travel-expense data associated with the travel-expense receipts;

automatically creating receipt dates of the travel-expense receipts that identify which of the travel-expense receipts for the plurality of business trips are associated with which of the plurality of business trips;

receiving travel dates of a particular business trip from a user after the particular business trip, the particular business trip being one of the plurality of business trips;

automatically determining which of the travel-expense receipts for the plurality of business trips are associated with the particular business trip based on the receipt dates of the travel-expense receipts and the travel dates of the particular business trip;

presenting the travel-expense receipts automatically determined as being associated with the particular business trip to the user;

enabling the user to select one or more of the presented travel-expense receipts as not being associated with the particular business trip; and disassociating the selected travel-expense receipts from the particular business trip.

* * * * *